E. J. DREW.
AIR FILTER FOR WALL REGISTERS.
APPLICATION FILED MAY 19, 1919.
1,319,763.
Patented Oct. 28, 1919.
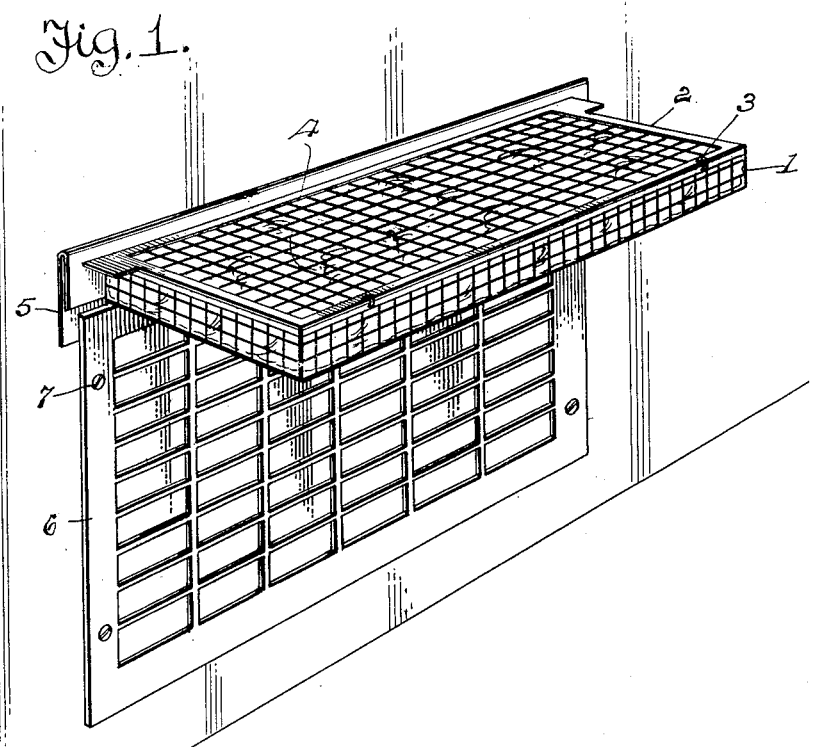
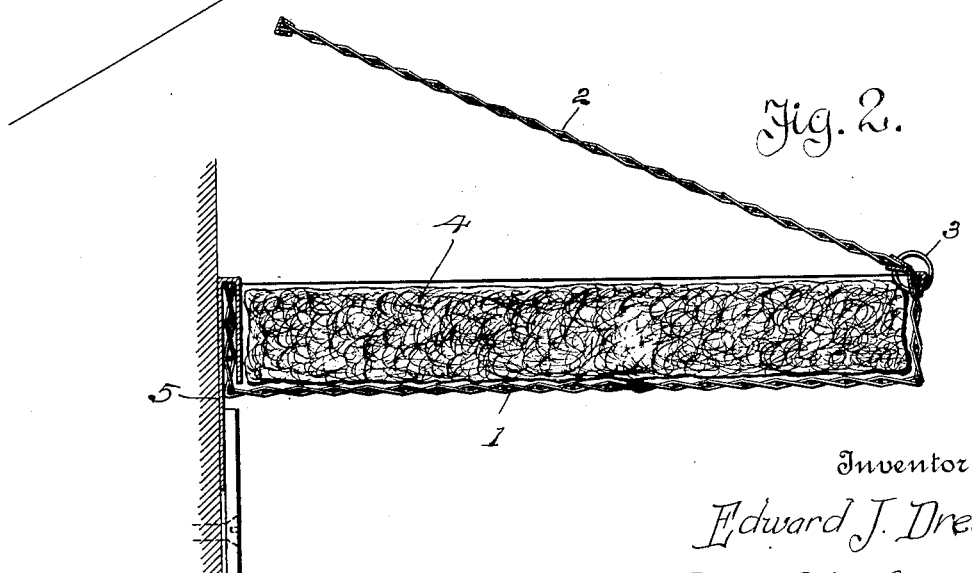
Inventor
Edward J. Drew,
By
Attorneys

UNITED STATES PATENT OFFICE.

EDWARD J. DREW, OF DETROIT, MICHIGAN.

AIR-FILTER FOR WALL-REGISTERS.

1,319,763.  Specification of Letters Patent.  Patented Oct. 28, 1919.

Application filed May 19, 1919. Serial No. 298,083.

*To all whom it may concern:*

Be it known that I, EDWARD J. DREW, a citizen of the United States of America, residing at Detroit, in the county of Wayne and State of Michigan, have invented certain new and useful Improvements in Air-Filters for Wall-Registers, of which the following is a specification, reference being had therein to the accompanying drawing.

This invention relates to devices for catching the dirt and dust arising from hot air wall registers and its object is to provide a simple device which is cheap to manufacture and may be readily installed and which is so constructed as to serve as a filter for the air and may also be used as a container for disinfectants.

With these and other ends in view the invention consists in the matters hereinafter set forth and more particularly pointed out in the appended claim, reference being had therein to the accompanying drawing in which—

Figure 1 is a perspective view of a device illustrative of the invention and showing the same as applied in use, and Fig. 2 is a transverse section of the same.

As shown in the drawing, 1 is a suitable receptacle or basket of suitable size and shape, formed of fabricated wire or other suitable open mesh material. This receptacle is preferably rectangular in form and shallow in depth, it being provided with a cover 2 which is made of the same material as the receptacle and is hinged at 3 to the forward edge of the receptacle. This receptacle is filled with a suitable porous material 4 preferably layers of cotton batting which, if desired, may be saturated with a suitable disinfectant or with water to give moisture to the air in the room.

A strip of sheet metal 5 is folded over the rear edge or side of the receptacle 1 and extended downwardly to form a flange on the receptacle which may be inserted behind the grating 6 of a wall register by simply loosening the screws 7 which hold the register in place and slipping this flange behind the upper edge of the grating. The receptacle is thus supported in a horizontal position directly above the register and is preferably made of such a length that it will fully cover or project beyond the ends of the register. The hot air rising from the register always creates a suction which draws into it particles of dirt and dust and these particles of dirt and dust will collect upon the wall above the register and in a short time ruin the decorations. With this device in place above the register all of the dirt and dust in the air is caught by the porous material contained in the basket and held thereby. The basket and material therein being porous allows the air to pass therethrough and this air will take up gradually the disinfectant or other material with which the cotton batting is moistened. The air in the room is therefore kept in a moist condition and a disenfectant disseminated if so desired.

By constructing the basket or receptacle of open mesh fabricated wire a very light construction is secured and one which does not interfere with the passage of the air through the material contained therein. This material may be any light porous substance which will readily absorb the fluid and which will catch every particle of dirt and dust and hold it in its meshes. It is not intended that this device should deflect the heat which is rising from the register but that it be such that the air will pass readily through it and in so doing be thoroughly filtered or cleansed of impurities and take up moisture held in the material contained in the device. When this material becomes dirty from taking up dust, etc., in the air, it may be readily taken out and a clean material put in its place.

Obviously, changes may be made in the construction and combination of parts within the scope of the appended claim without departing from the spirit of my invention and I do not therefore limit myself to the particular construction shown.

Having thus fully described my invention, what I claim is:

A device of the character described, comprising a basket of rectangular form and of shallow depth, said basket being formed of an open mesh wire material, a loose fibrous material in the basket, a cover hinged to the basket and formed of open mesh wire material, and a supporting flange on one side of the basket adapted to support the basket in an outstanding horizontal position above a wall register.

In testimony whereof I affix my signature in presence of two witnesses.

EDWARD J. DREW.

Witnesses:
ANNA M. DORR,
LEWIS E. FLANDERS.